Feb. 19, 1929.  1,702,777
W. R. HEWITT
BRAKE ACTUATING MECHANISM
Filed Aug. 22, 1927  2 Sheets-Sheet 2
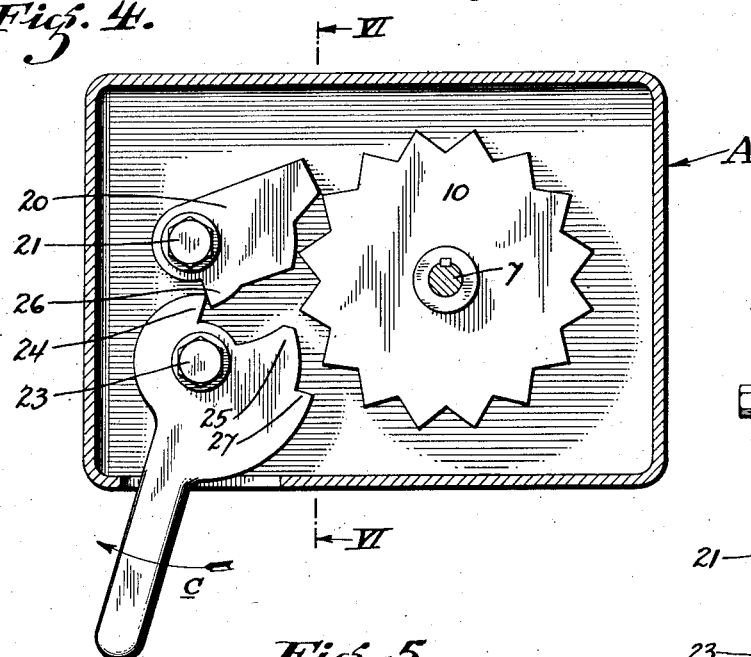
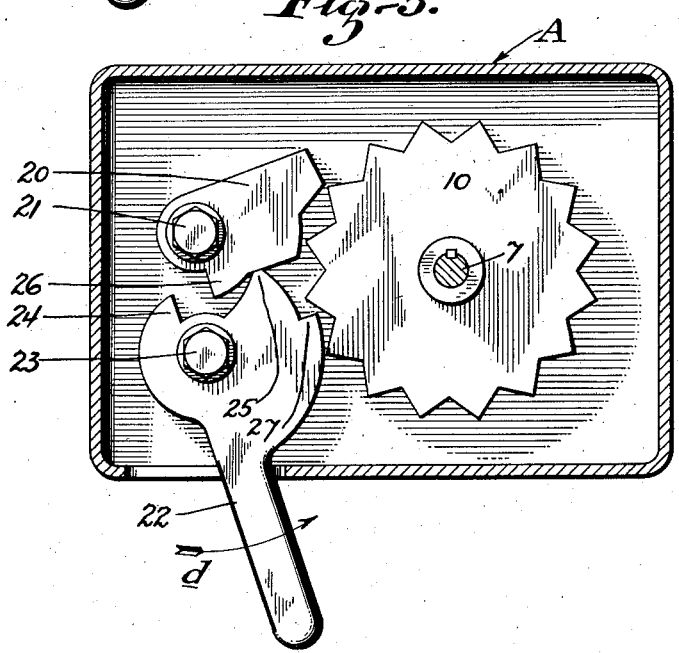
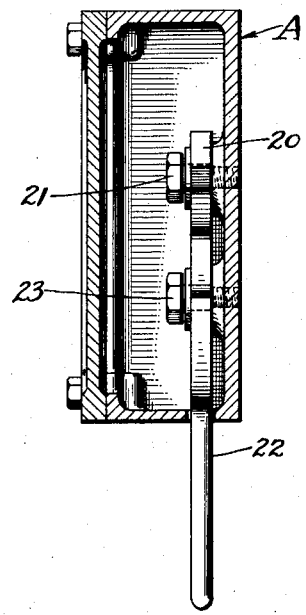
INVENTOR.
William R. Hewitt.
BY Townsend, Loftus & Abbett
ATTORNEYS.

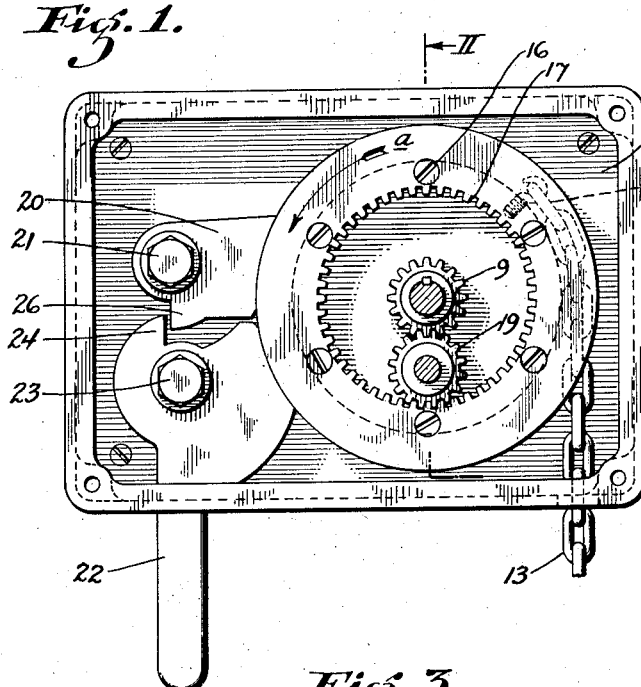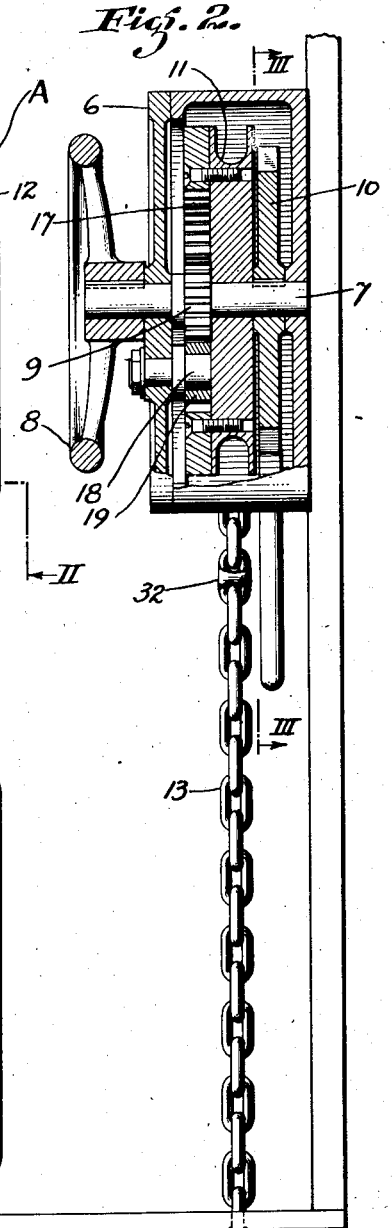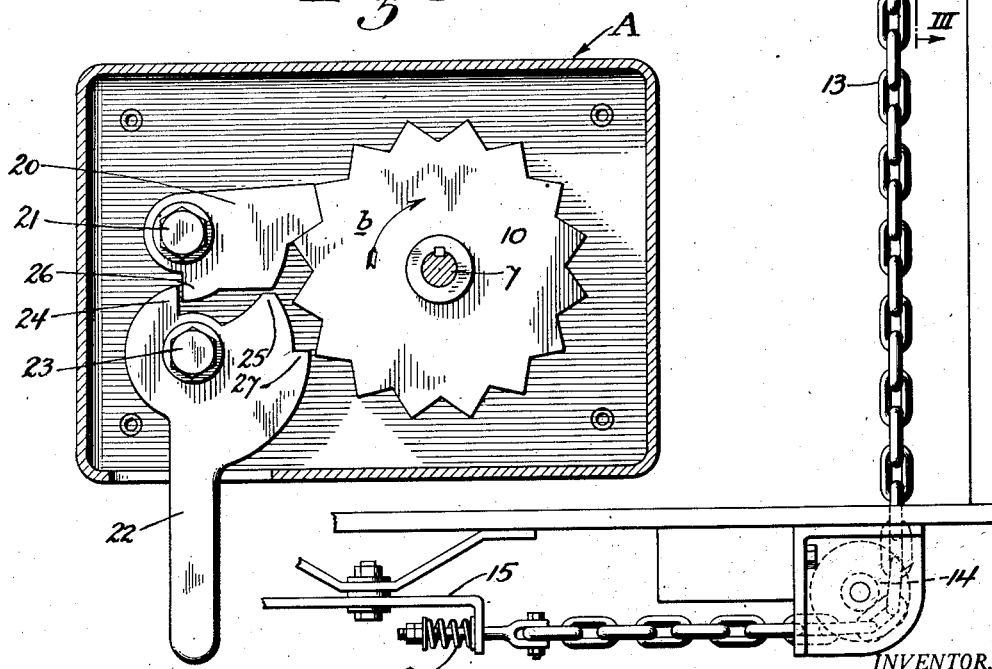

Patented Feb. 19, 1929.

1,702,777

UNITED STATES PATENT OFFICE.

WILLIAM R. HEWITT, OF NEW YORK, N. Y.

BRAKE-ACTUATING MECHANISM.

Application filed August 22, 1927. Serial No. 214,661.

This invention relates to a brake actuating mechanism and especially to a hand-power control brake actuating mechanism for railway cars and the like.

The object of the present invention is to generally improve and simplify the construction and operation of brake actuating mechanisms such as employed on railway cars and the like and especially to provide a hand control brake actuating mechanism whereby pressure may be gradually applied when the brakes are set, and conversely, gradually released through a step by step rotary movement or substantially instantaneously released at the will of the brakeman or other operator.

The invention, briefly stated, embodies an internal reduction gear drive whereby a sheave may be rotated in one direction, said sheave having a cable or chain attached thereto which is bound about the sheave when it is rotated and as such exerts a pull to apply the brakes. The invention also embodies means for maintaining a constant pull or pressure on the brakes regardless of expansion or contraction of the brake rods or connected levers due to temperature variations; and the invention further embodies a pawl and ratchet actuating mechanism whereby pressure on the brakes may be gradually released through a step by step rotary movement of the sheave or substantially instantaneously released at the will of the operator.

The invention is shown by way of illustration in the accompanying drawings in which:

Fig. 1 is a front view of a casing containing the brake actuating mechanism, the cover of the casing being removed, Fig. 2 is a cross-section taken on line II—II, Fig. 1, Fig. 3 is a section taken on line III—III, Fig. 2, Figs. 4 and 5 are sections taken on line III—III, Fig. 2, showing different positions of the pawl and ratchet and the pawl actuating trip lever, Fig. 6 is a cross-section taken on line VI—VI, Fig. 4.

Referring to the drawings in detail and particularly Figs. 1 and 2, A indicates a rectangular-shaped casing which is adapted to be bolted or otherwise secured to one or both ends of a railroad car. The casing is provided with a cover member 6 and a shaft 7 extends through the casing and is journaled at one end in the cover and at the opposite end in the back of the casing. Secured on the shaft by keys or the like is a hand-wheel 8, a driving pinion 9 and a ratchet gear 10. Turnably mounted on the shaft is a sheave 11 to which is secured as at 12 one end of a chain 13. The opposite end of the chain passes over a guide roller 14 and is attached to a brake rod 15 or a like mechanism. Secured to one face of the sheave by means of screws or the like such as shown at 16 is an internal gear 17. Secured in the cover member 6 is a shaft 18 and journaled thereon is an intermediate pinion 19. This pinion intermeshes with the driving pinion 9 and with the internal gear 17, and when shaft 7 is rotated by means of the hand-wheel 8, power is transmitted through the gears 9 and 19 to rotate the internal gear 17 and the sheave 11.

This causes the chain to be wound about the sheave and a pull to be exerted on the brake rod 15, thereby applying the brakes. It was previously stated that the hand-wheel 8, the pinion 9 and the ratchet gear 10 were keyed or otherwise secured to the shaft 7. Hence, if the hand-wheel is rotated in a clockwise direction, the internal gear 17 and sheave 11 will rotate in an anti-clockwise direction as indicated by arrow $a$ (see Fig. 1). Due to the reverse direction of rotation transmitted through the intermediate pinion 19, the ratchet gear 10 will rotate with the hand-wheel 9 as it is keyed on the shaft 7 and as such will be rotated in a clockwise direction as shown by arrow $b$ (see Fig. 3). The ratchet gear and a pawl 20 cooperating therewith serves the function of securing the sheave against rotation when the brake mechanism has been applied. The ratchet gear and the pawl 20 also serve another function, to-wit, that of gradually releasing the brake mechanism through a step by step movement or that of substantially instantaneously releasing the brake mechanism as will hereinafter be described.

This is accomplished as follows:

By referring to Fig. 3, it will be noted that the pawl 20 is pivotally attached to the casing A as at 21. It will also be noted that a trip lever generally indicated at 22 is pivotally mounted in the casing at the point 23. The head portion of the trip lever is provided with two lugs such as indicated at 24 and 25. If the trip lever is swung in the direction of arrow c (see Fig. 4), lug 24 will engage a lug 26 on the pawl 20 and the pawl will be swung out of engagement with the teeth of the ratchet gear as shown in Fig. 4 and the brake mechanism will thus be substantially instantaneously released. On the other hand, if it is desired to gradually release the brake through a step by step movement, the trip lever is swung about its pivot in the direction of arrow d (see Fig. 5). In that instance lug 25 will engage the lower face of the pawl and it will again be raised out of engagement with relation to the teeth of the ratchet gear 10. It will, however, be noted that a pawl 27 is formed on the head of the trip lever and that this pawl swings into the path of the teeth of the ratchet gear. Hence, when the trip lever is swung in the direction of arrow d (see Fig. 5), pawl 20 will be raised out of engagement with the teeth, but pawl 27 will move into the path of the teeth. The result will be that the ratchet gear, shaft 7 and the sheave 11 will rotate the distance of one tooth. By swinging the trip lever in the direction of arrow c or reverse to the direction of arrow d, pawl 20 will drop back into engagement with the teeth of the ratchet gear and pawl 27 will move away therefrom, thus permitting the ratchet gear, the shaft 7 and the sheave to rotate the distance of another tooth. By again swinging the trip lever in the direction of arrow d, pawl 20 will be raised and pawl 27 will engage. Thus, by rocking or oscillating the trip lever, a step by step rotary movement of the sheave 11 will be permitted and the brake mechanism will be gradually released.

By referring to Fig. 3, it will be noted that a spring 30 is interposed between the end of the chain and the brake rod 15. This spring is compressed to a certain degree when the brakes are applied. The purpose of the spring is to maintain a tension at all times in the braking system when the brakes have been set hard by the operation of the hand-wheel and the planetary reduction gear. It is possible, due to climatic conditions when a car has been standing for any length of time with its brakes supposedly set, that the pressure or tension on the brakes has slackened due to expansion of the rods, the chain etc., thus releasing the car. Such accidental release is entirely avoided in the present instance by the take-up of the spring 30, the tension or compression of the spring being such that an appreciable amount of expansion can be allowed in the brake rods and connected parts without permitting release of the brakes.

For purposes of convenience, one of the links of the chain 13 may be marked, for instance by providing a solid portion as shown at 32, by painting the link another color or otherwise. This is essential as the position of the marked link indicates whether the brakes are applied or released. For instance, if the marked link is at a point just below the housing A, it indicates that the brakes are applied. On the other hand, if the link is considerably lower or at a point adjacent the floor of the car, it indicates that the brakes are released, thus giving the brakeman or other operator a visual indication of the position of the brakes.

While certain features of the present invention are more or less specifically described, I wish it understood that various changes may be resorted to within the scope of the appended claims. Similarly, that the materials and finishes of the several parts employed may be such as the manufacturer may decide or varying conditions or uses may demand.

Having thus described my invention, what I claim and desire to secure by Letters Patent is:—

1. A brake actuating mechanism comprising a housing, a shaft journaled therein, a sheave on the shaft, a ratchet gear secured to the shaft, a cable attached at one end to the sheave and at the opposite end to a brake applying mechanism, means for manually rotating the shaft, the sheave and the ratchet gear to wind the cable about the sheave so as to exert a pull on the brake applying mechanism, a pawl cooperating with the ratchet gear, a trip lever cooperating with the pawl and the ratchet gear, and a pair of pawls on the trip lever, one engageable with the first named pawl to raise said pawl out of engagement with relation to the ratchet gear and the other pawl on the trip lever adapted to engage the ratchet gear.

2. A brake actuating mechanism comprising a housing, a shaft journaled therein, a ratchet gear secured to the shaft, a driving pinion secured on the shaft, a sheave freely rotatable on the shaft, an internal gear secured to the sheave, an intermediate gear journaled in the casing and meshing with the driving pinion and the internal gear, a cable attached at one end to the sheave and at the opposite end to a brake applying mechanism, means for rotating the shaft so as to rotate the driving pinion, the intermediate pinion, the internal gear and the sheave in a direction which will cause the cable to wind about the sheave and thereby exert a pull on the brake applying mechanism, a pawl engageable with the ratchet gear to secure the sheave against reverse direction when a brake has been set by the brake applying mechanism, and a trip lever pivotally mounted in the casing, said trip lever having a lug formed thereon engageable with the pawl to move the same to a releasing position, said trip lever also having a pawl formed thereon which is adapted to engage the ratchet gear and thereby permit a step by step movement of the ratchet gear and the sheave in a reverse direction to release the brake applying mechanism and the brake.

3. A brake actuating mechanism comprising a housing, a shaft journaled therein, a ratchet gear secured to the shaft, a driving pinion secured on the shaft, a sheave freely rotatable on the shaft, an internal gear secured to the sheave, an intermediate gear journaled in the casing and meshing with the driving pinion and the internal gear, a cable attached at one end to the sheave and at the opposite end to a brake applying mechanism, means for rotating the shaft so as to rotate the driving pinion, the intermediate pinion, the internal gear and the sheave in a direction which will cause the cable to wind about the sheave and thereby exert a pull on the brake applying mechanism, a pawl engageable with the ratchet gear to secure the sheave against reverse direction when a brake has been set by the brake applying mechanism, and a trip lever pivotally mounted in the casing, said trip lever having a lug formed thereon engageable with the pawl to move the same to a releasing position, said trip lever also having a pawl formed thereon which is adapted to engage the ratchet gear and thereby permit a step by step movement of the ratchet gear and the sheave in a reverse direction to release the brake applying mechanism and the brake, said trip lever also having a second lug formed thereon engageable with the first-named pawl to move it to a release position, said second-named lug being engageable with the pawl when the trip lever is swung in a direction which will move the pawl mounted thereon out of engagement with the ratchet gear.

4. In a device of the character described, the combination with the shaft and the ratchet gear secured thereon, of a pawl pivotally mounted in the casing and normally engageable with the teeth of the ratchet gear, a trip lever pivotally mounted in the casing, a pair of lugs formed on the trip lever, either lug adapted to engage the pawl during swinging movement of the trip lever to raise it out of engagement with the teeth of the ratchet gear, and a pawl on the trip lever engageable with the teeth of the ratchet gear when the trip lever is swung in one direction.

5. In a device of the character described the combination with a shaft and a ratchet gear secured thereon; of a pawl pivotally mounted in the casing and normally engageable with the teeth of the ratchet gear; a trip lever pivotally mounted in the casing; a lug formed on the trip lever and engageable with the pawl to swing the pawl with relation to the ratchet gear; a pawl on the trip lever engageable with the teeth of the ratchet gear; the lug on the trip lever engaging and releasing the first named pawl when the trip lever is swung in one direction and the pawl on the trip lever engaging the teeth of the ratchet gear when the first named pawl is released; reversed swinging movement of the trip lever causing release of the pawl on the trip lever and engagement of the first named pawl, thereby permitting a step by step rotary movement of the ratchet gear.

WILLIAM R. HEWITT.